(12) United States Patent
Kim et al.

(10) Patent No.: US 11,393,340 B2
(45) Date of Patent: Jul. 19, 2022

(54) AUTOMATIC PARKING SYSTEM AND AUTOMATIC PARKING METHOD

(71) Applicants: HYUNDAI MOTOR COMPANY, Seoul (KR); KIA MOTORS CORPORATION, Seoul (KR)

(72) Inventors: Yoon Soo Kim, Suwon-si (KR); Jin Ho Park, Hwaseong-si (KR); Joo Woong Yang, Seoul (KR); Jae Hwan Jeon, Seoul (KR); Kyung Soo Ha, Pohang-si (KR); Min Byeong Lee, Seongnam-si (KR); Seung Wook Park, Yongin-si (KR); Jong Ho Lee, Seongnam-si (KR); In Yong Jung, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 354 days.

(21) Appl. No.: 16/570,107

(22) Filed: Sep. 13, 2019

(65) Prior Publication Data

US 2020/0005649 A1    Jan. 2, 2020

Related U.S. Application Data

(63) Continuation-in-part of application No. 15/835,338, filed on Dec. 7, 2017, now Pat. No. 10,449,955.

(30) Foreign Application Priority Data

Dec. 30, 2016    (KR) .......................... 10-2016-0184298

(51) Int. Cl.
*G08G 1/16*    (2006.01)
*G08G 1/14*    (2006.01)
(Continued)

(52) U.S. Cl.
CPC .............. *G08G 1/168* (2013.01); *B60Q 9/005* (2013.01); *B60R 1/00* (2013.01); *B62D 15/028* (2013.01);
(Continued)

(58) Field of Classification Search
CPC ...... B60W 30/06; B60W 10/10; B60W 10/18; B60W 10/20; B60W 40/10; B60W 50/14; G06K 9/00812; G08G 1/16; G08G 1/168
See application file for complete search history.

(56) References Cited

U.S. PATENT DOCUMENTS 4,931,930 A * 6/1990 Shyu ..................... B60Q 9/007
                                                                                              180/167
8,374,749 B2    2/2013 Tanaka
(Continued)

FOREIGN PATENT DOCUMENTS

DE    102015203619 A1    9/2016
JP    2006-021722 A    1/2006
(Continued)

OTHER PUBLICATIONS

Communication Pursuant to Article 94(3) EPC issued in European Application No. 17 205 382.9 dated Jul. 22, 2019.
(Continued)

*Primary Examiner* — Tan Q Nguyen
(74) *Attorney, Agent, or Firm* — Morgan, Lewis & Bockius LLP

(57) ABSTRACT

An automatic parking system includes a sensor detecting parking areas depending on a size of a subject vehicle and a controller controlling the subject vehicle to be parked in an optimal parking area among the parking areas, in which the sensor may detect the parking areas in consideration of a length and a width of the subject vehicle and detect a spaced distance from surrounding vehicles positioned on a side of
(Continued)

the subject vehicle in the optimal parking area and the controller may calculate a moving path between a current position of the subject vehicle and the optimal parking area and compare a predetermined reference distance and the spaced distances to control the subject vehicle.

14 Claims, 11 Drawing Sheets

(51) Int. Cl.
    *B62D 15/02*     (2006.01)
    *B60Q 9/00*     (2006.01)
    *B60R 1/00*     (2022.01)
    *G06V 20/58*     (2022.01)
    *B60W 30/06*     (2006.01)

(52) U.S. Cl.
    CPC ..... *B62D 15/0275* (2013.01); *B62D 15/0285* (2013.01); *G06V 20/586* (2022.01); *G08G 1/143* (2013.01); *B60R 2300/806* (2013.01)

(56) References Cited

U.S. PATENT DOCUMENTS

| | | | |
|---|---|---|---|
| 8,504,245 B2 | 8/2013 | Sasajima | |
| 8,538,631 B2 | 9/2013 | Lee et al. | |
| 8,825,221 B2 | 9/2014 | Huger et al. | |
| 10,239,520 B2* | 3/2019 | Tomozawa | B62D 15/0285 |
| 2004/0130464 A1 | 7/2004 | Schindler et al. | |
| 2008/0091320 A1 | 4/2008 | Sakai | |
| 2009/0157260 A1 | 6/2009 | Lee | |
| 2010/0274446 A1* | 10/2010 | Sasajima | G08G 1/165 701/36 |
| 2013/0151060 A1 | 6/2013 | Lee et al. | |
| 2015/0307089 A1* | 10/2015 | Vorobieva | B62D 15/027 701/25 |
| 2016/0284217 A1 | 9/2016 | Lee et al. | |
| 2016/0371983 A1 | 12/2016 | Ronning et al. | |
| 2017/0043808 A1* | 2/2017 | Yang | G08G 1/143 |
| 2017/0300057 A1* | 10/2017 | Kim | B62D 15/02 |
| 2018/0208114 A1* | 7/2018 | Kinoshita | G08G 1/165 |
| 2019/0039606 A1* | 2/2019 | Fujita | B60R 21/00 |
| 2019/0054927 A1* | 2/2019 | Hayakawa | G08G 1/14 |
| 2019/0375397 A1* | 12/2019 | Bae | B62D 15/027 |

FOREIGN PATENT DOCUMENTS

| | | |
|---|---|---|
| JP | 2007-131169 A | 5/2007 |
| JP | 2009-020657 A | 1/2009 |
| JP | 2012-116282 A | 6/2012 |
| JP | 2013-093013 A | 5/2013 |
| JP | 2013-241088 A | 12/2013 |
| JP | 2014-065342 A | 4/2014 |
| KR | 10-2013-0065115 A | 6/2013 |
| KR | 10-2013-0106940 A | 10/2013 |
| KR | 10-1426468 B1 | 8/2014 |
| KR | 10-2015-0061422 A | 6/2015 |

OTHER PUBLICATIONS

Extended European Search Report dated Aug. 1, 2018 issued in European Patent Application No. 17205382.9.
J. Jernstrom, "Autonomous Parallel Parking—A study based on the implementation of a car-like mobile robot," May 2008, pp. 1-18.
Partial European Search Report dated May 9, 2018 issued in European Patent Application No. 17205382.9.
Korean Office Action dated Feb. 8, 2018 issued in Korean Patent Application No. 10-1016-0184298, with English translation.
Notice of Allowance issued in corresponding U.S. Appl. No. 15/835,338 dated Jun. 11, 2019.
Non-Final Office Action issued in corresponding U.S. Appl. No. 15/835,338 dated Nov. 29, 2018.
Office Action and Search Report (with English Translation) dated Mar. 25, 2022, issued in corresponding Chinese Patent Application No. 201711274873.1.

* cited by examiner

[Fig. 1]
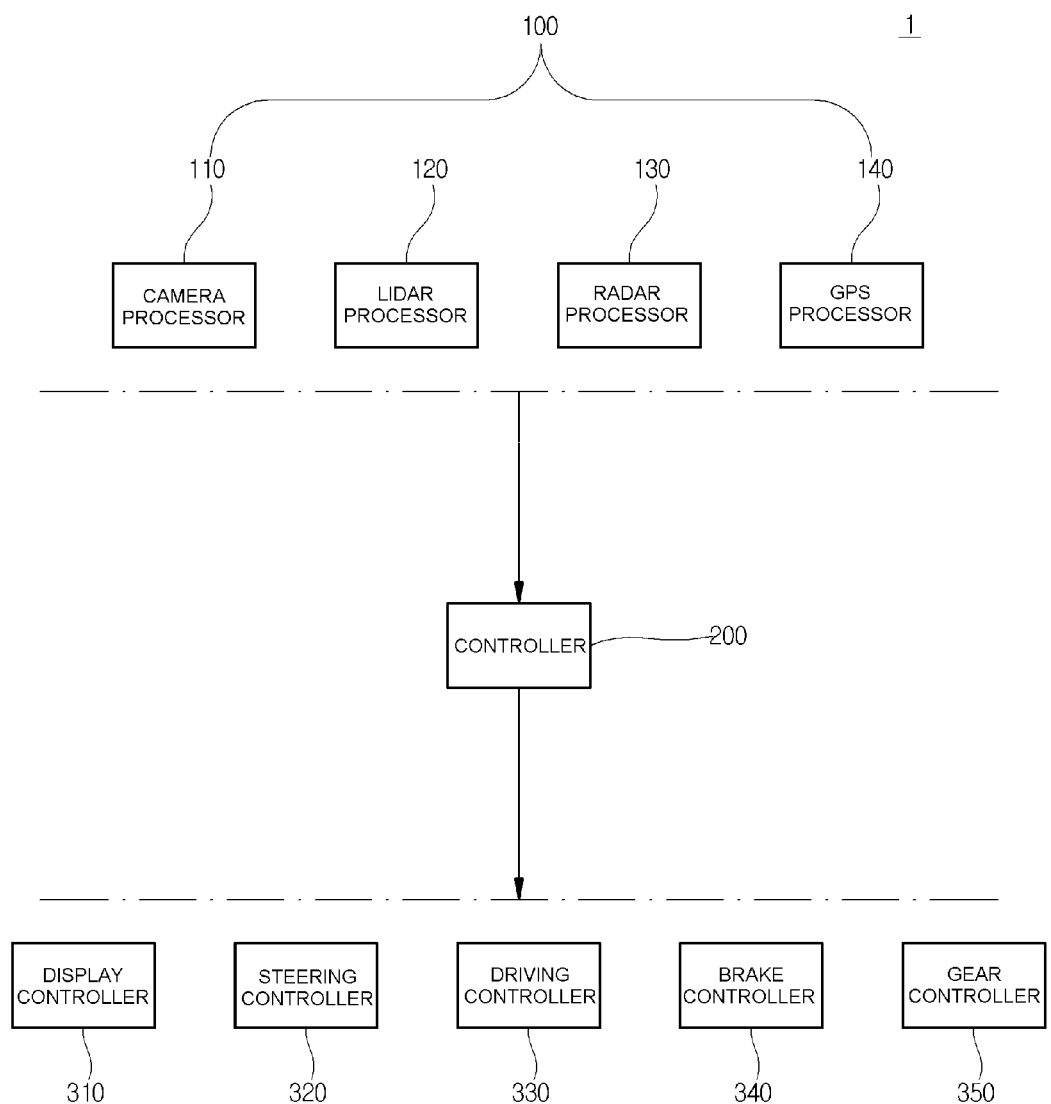

[Fig. 2]
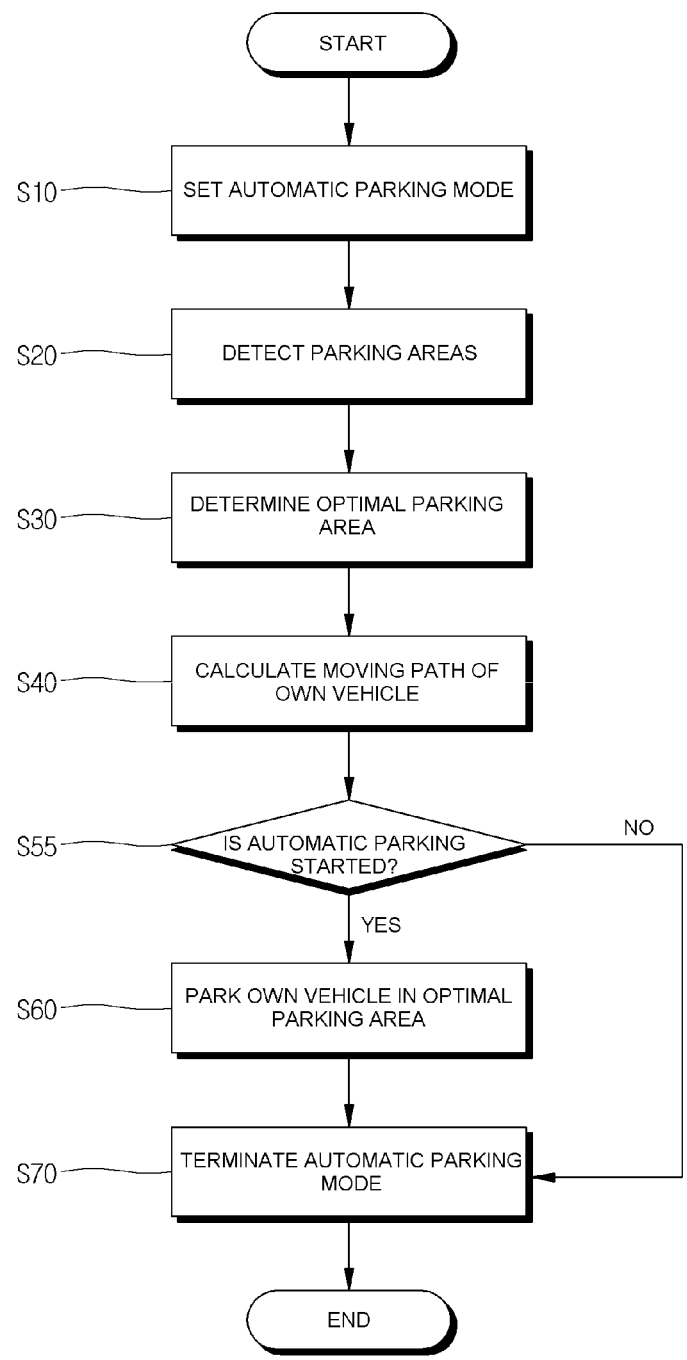

[Fig. 3]
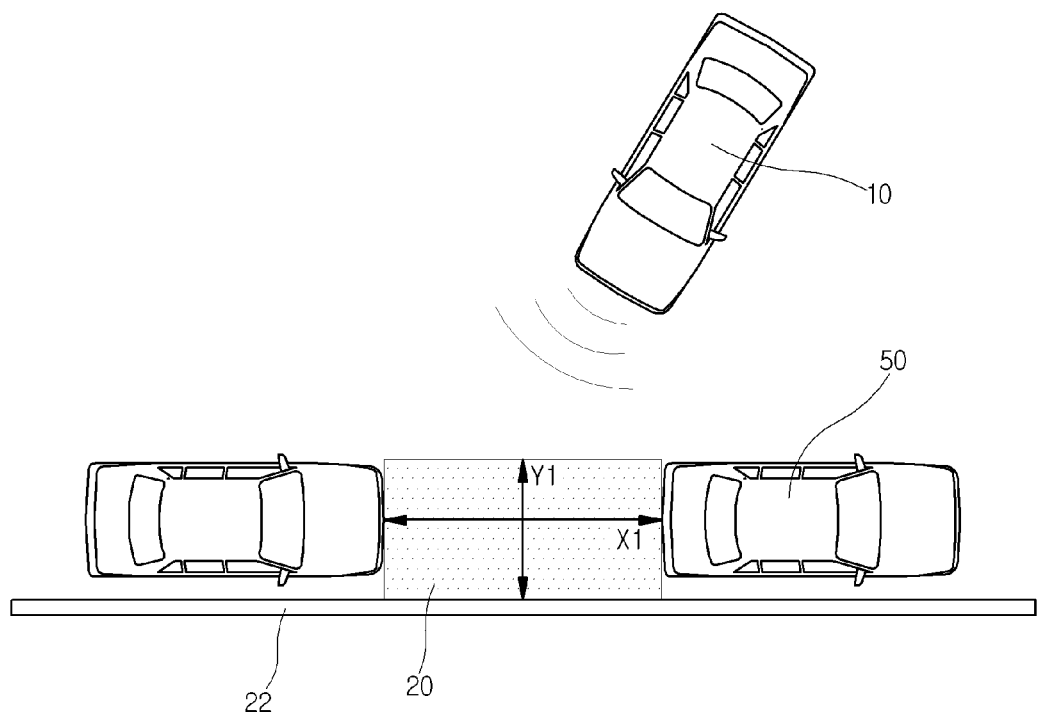

[Fig. 4]
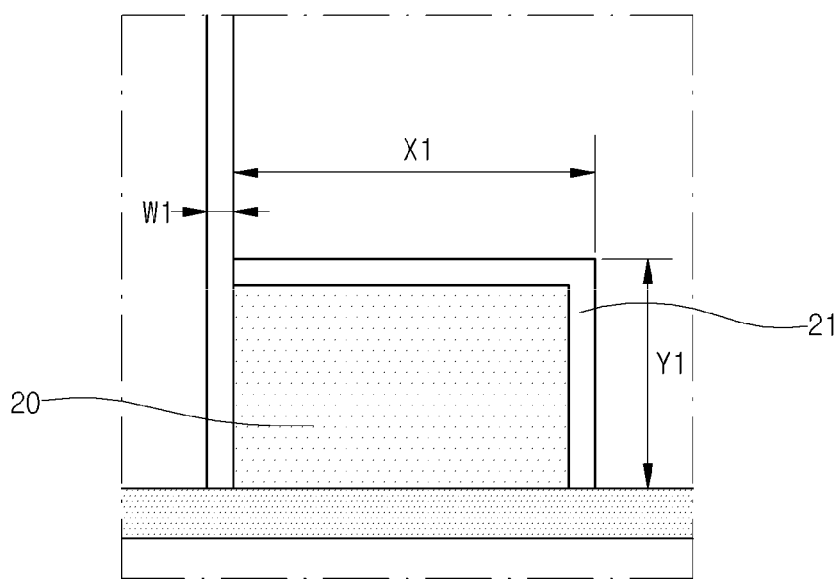

[Fig. 5]
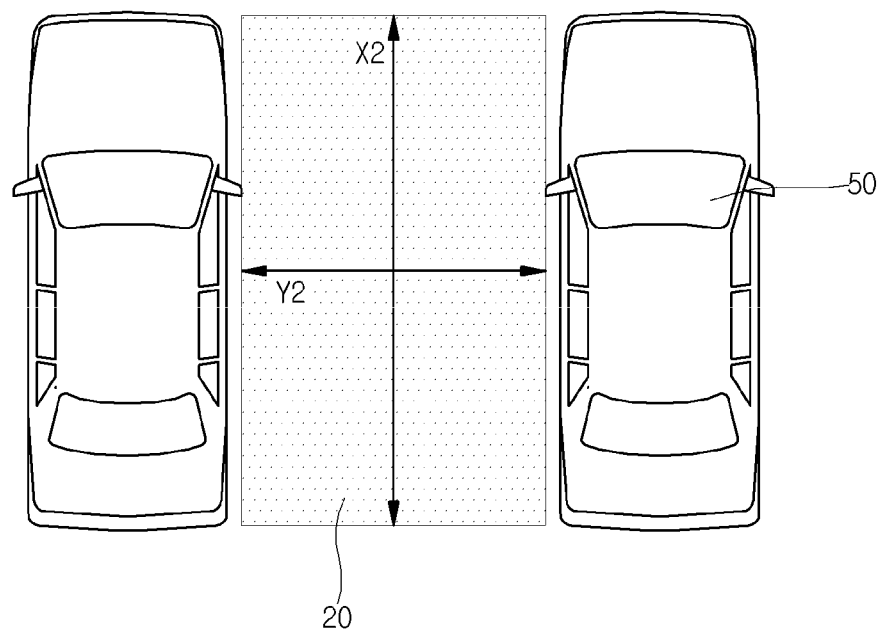

[Fig. 6]
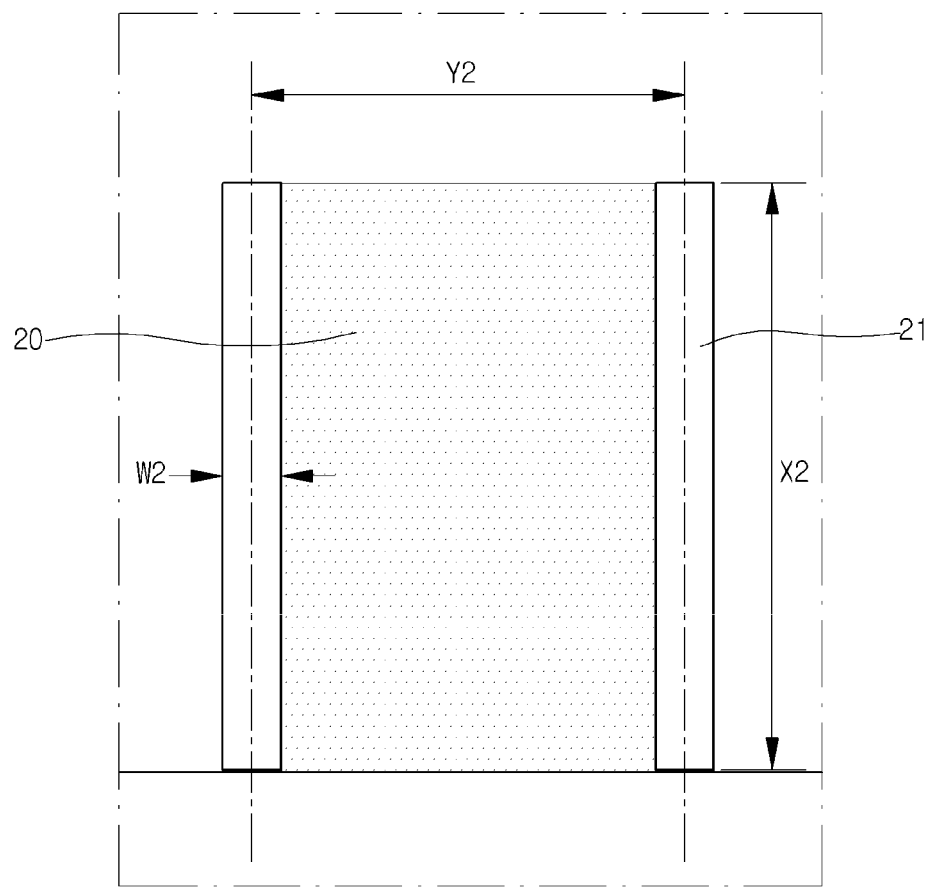

[Fig. 7]
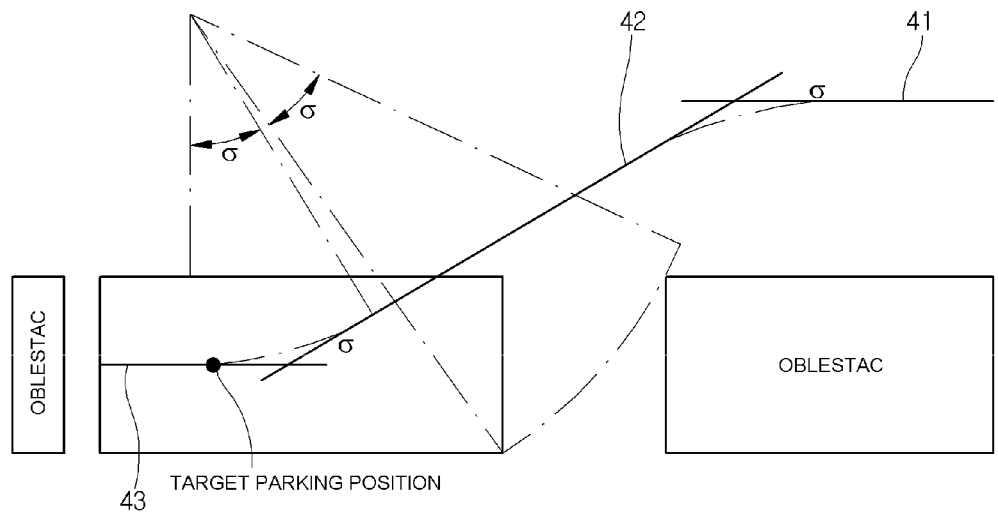
[Fig. 8]
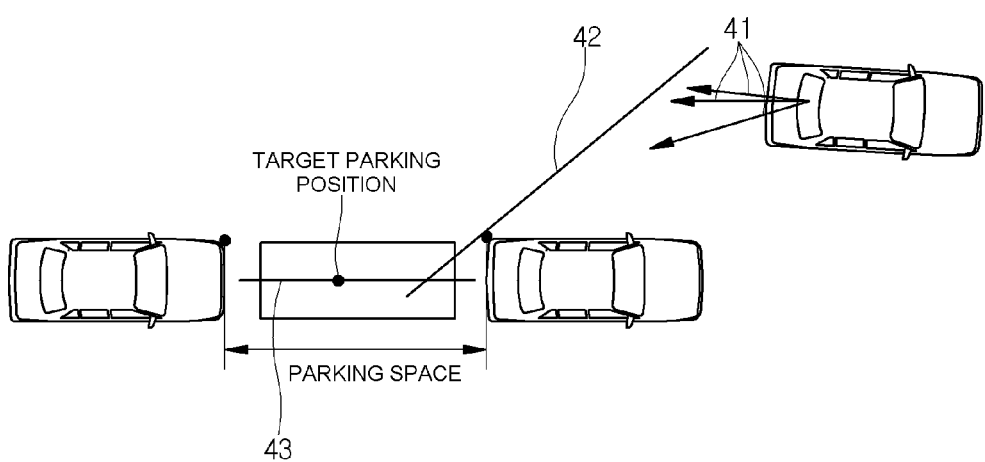

[Fig. 9]
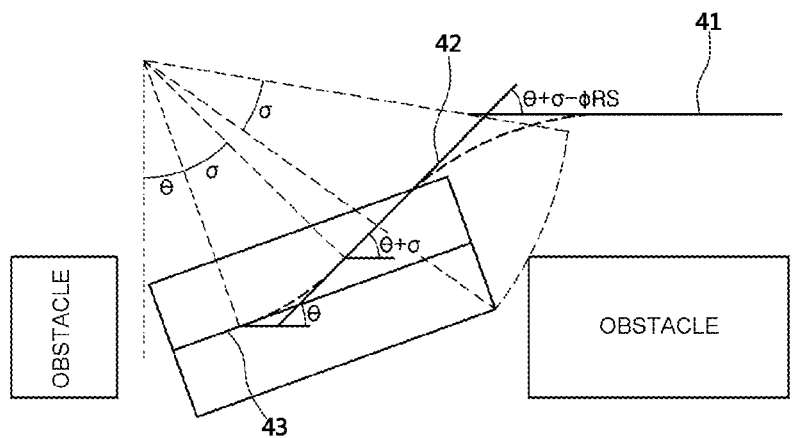
[Fig. 10]
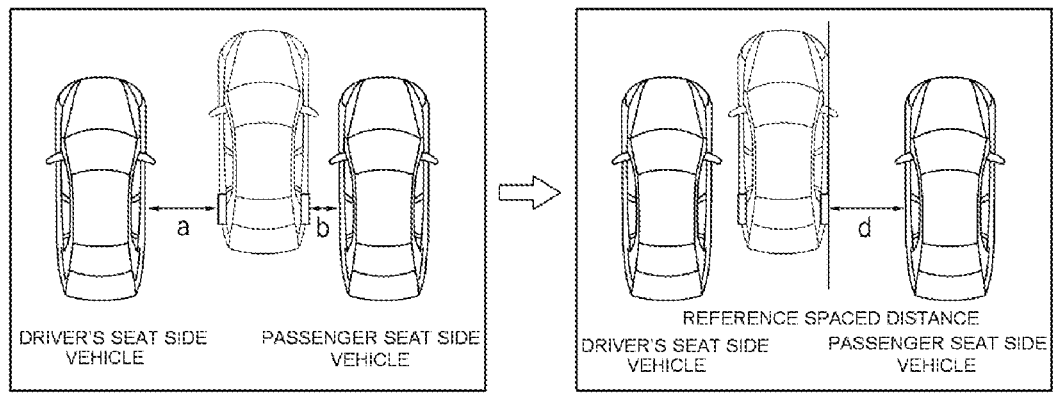

[Fig. 11]
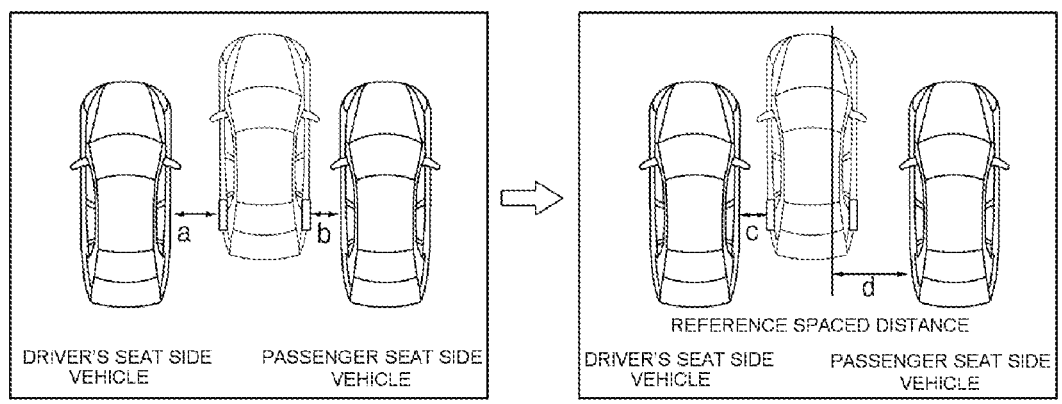

[FIG. 12]
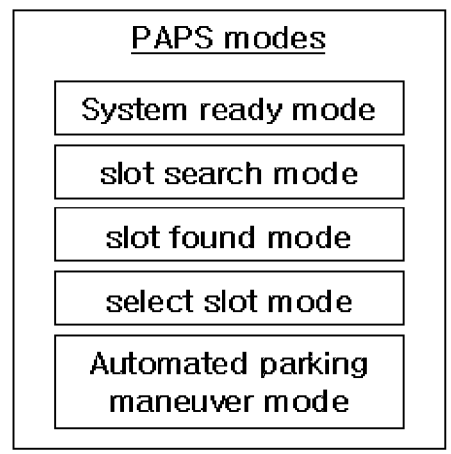

[FIG. 13]
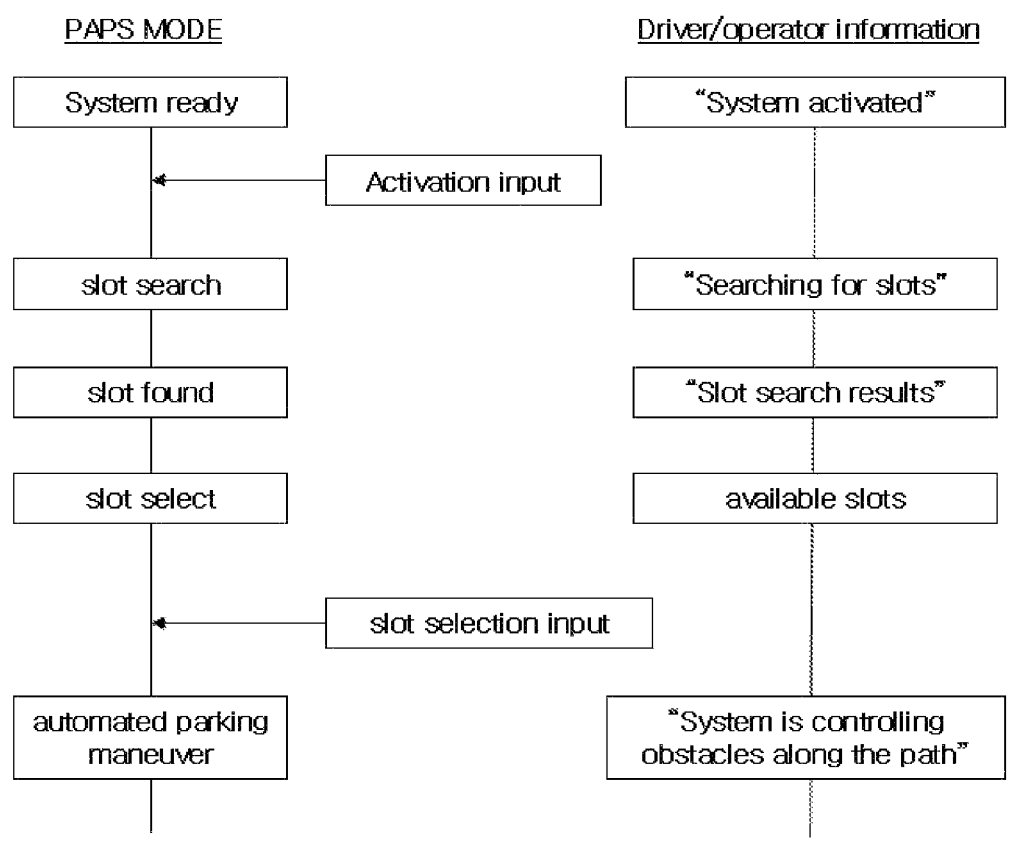

AUTOMATIC PARKING SYSTEM AND AUTOMATIC PARKING METHOD

CROSS-REFERENCE TO RELATED APPLICATION

This application is a continuation-in-part of U.S. patent application Ser. No. 15/835,338 filed on Dec. 7, 2017, which claims the benefit of priority to Korean Patent Application No. 10-2016-0184298, filed on Dec. 30, 2016 with the Korean Intellectual Property Office, the entire disclosures of both are incorporated herein by reference.

TECHNICAL FIELD

Exemplary embodiments of the present disclosure relate to automatic parking, and more particularly, to an automatic parking system and an automatic parking method that use detection of a parking area.

BACKGROUND

The automatic parking system is a system capable of enabling an inexperienced driver with parking to conveniently park his/her vehicle. In the automatic parking system, when parking a vehicle, a driver determines a position of an obstacle by using a camera or an ultrasonic sensor attached to a rear portion of the vehicle, and selects parallel parking or perpendicular parking, and then the automatic parking system performs a predetermined operation.

In particular, in a case of an automatic parking system using a camera, once the driver selects a parking position while checking a rear visual field through a monitor and finally selects parking of the vehicle, the automatic parking system automatically controls a steering wheel of the vehicle using a sensor value, thereby safely parking the vehicle. Further, a parking area may be set in advance through the camera and a sensor, and the automatic parking system performs automatic parking through data obtained by the camera and the sensor.

SUMMARY

An object of the present disclosure is to an automatic parking system and an automatic parking method capable of setting an optimal parking area among parking areas to automatically perform parking from a current position of a subject vehicle to the optimal parking area.

Another object of the present disclosure is to conveniently derive a moving path without a complicated calculation by deriving the moving path based on a backward straight path within a turning radius angle for parking.

An object of the present disclosure is to provide an automatic parking system and an automatic parking method capable of automatically parking a vehicle to reduce inconvenience felt due to space shortage when a driver gets into and out of own vehicle and other vehicles after parking.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

An automatic parking system includes: a sensor detecting parking areas depending on a size of a subject vehicle; and a controller controlling the subject vehicle to be parked in an optimal parking area among the parking areas, in which the sensor may detect the parking areas in consideration of a length and a width of the subject vehicle and detect spaced distances from surrounding vehicles positioned on a side of the subject vehicle in the optimal parking area and the controller may calculate a moving path between a current position of the subject vehicle and the optimal parking area and compare a predetermined reference distance and the spaced distances to control the subject vehicle.

The controller may calculate: a first extended straight line including a straight moving path at a time of an initial reverse from a steering angle that has been in a neutral position; a second extended straight line in a longitudinal direction of the optimal parking area; and an intermediate extended straight line connecting between the first extended straight line and the second extended straight line so that the subject vehicle moving backward along the first extended straight line coincides with the second extended straight line without colliding with an obstacle when turning and moving backward toward the second extended straight line.

A slope of the intermediate extended straight line may coincide with the second extended straight line by turning the subject vehicle coinciding with the intermediate extended straight line at a minimum turning radius.

The second extended straight line may be set as a straight path having a predetermined angle of slope with respect to the longitudinal direction when a length of the optimal parking area in the longitudinal direction is determined to be short with respect to a predetermined length.

The controller may control the subject vehicle so that a first spaced distance from a passenger seat side vehicle positioned on a passenger seat side of the subject vehicle is adjusted to be the predetermined reference distance based on the space distances.

The controller may adjust the first spaced distance to be the predetermined reference distance when the first spaced distance is smaller than the predetermined reference distance and then determine whether a second spaced distance between the subject vehicle and a driver's seat side vehicle positioned on the driver's seat of the subject vehicle is equal to or greater than the predetermined reference distance.

The controller may control the subject vehicle so that the second spaced distance is the predetermined reference distance when the second spaced distance is equal to or greater than the predetermined reference distance.

The controller may control the subject vehicle so that the second spaced distance is a predetermined minimum spaced distance when the second spaced distance is less than the predetermined reference distance.

The minimum spaced distance may be set to be a distance between a main lane positioned between the subject vehicle and the driver's seat side vehicle and the subject vehicle.

The controller may determine whether a second spaced distance between the subject vehicle and a driver's seat side vehicle positioned on the driver's seat side of the subject vehicle is equal to or greater than a predetermined critical distance when the first spaced distance is smaller than the predetermined reference distance and the critical distance may be set to be a value obtained by adding a predetermined minimum spaced distance to a moving distance of the first spaced distance so that the first spaced distance is adjusted to the predetermined reference distance.

The sensor may include: a first sensor detecting surrounding vehicles around the optimal parking area and a parking line; and a second sensor detecting an object approaching the subject vehicle while the subject vehicle moves to the moving path.

The automatic parking system may further include: a display unit informing a driver of the parking areas, in which the controller may control the vehicle to be driven in the optimal parking area selected by the driver.

The controller may control steering, acceleration, brake, gear shift, and parking brake of the subject vehicle.

An automatic parking method for automatically parking a subject vehicle includes steps of: setting, by a driver of the subject vehicle, an automatic parking mode; detecting, by a sensor, parking areas in consideration of a length and a width of the subject vehicle; selecting, by the driver, an optimal parking area among the parking areas which is determined by a controller; calculating, by the controller, a moving path between a current position of the subject vehicle and the optimal parking area; and automatically parking, by the controller, the subject vehicle in the optimal parking area, in which the subject vehicle may be controlled by sensing spaced distances between the subject vehicle and the surrounding vehicles in the optimal parking area.

The automatic parking method may further include: terminating the automatic parking mode, after the automatically parking of the subject vehicle, in which the terminating of the automatic parking mode may be performed by turning off an automatic parking mode switch or shifting a gear to parking.

In the step of automatically parking the subject vehicle, when an automatic parking mode switch is turned off or a gear is shifted to parking, the automatic parking mode may be terminated.

In the step of automatically parking the subject vehicle, when any one of gear shift, steering change, and brake operation is performed, the automatic parking mode may be stopped.

The step of calculating a moving path between a current position of the subject vehicle and the optimal parking area may include: calculating a first extended straight line including a straight moving path at a time of an initial reverse from a steering angle that has been in a neutral position; calculating a second extended straight line in a longitudinal direction of the optimal parking area; and calculating an intermediate extended straight line connecting between the first extended straight line and the second extended straight line so that the subject vehicle moving backward along the first extended straight line coincides with the second extended straight line without colliding with an obstacle when turning and moving backward toward the second extended straight line.

The spaced distances may include a first spaced distance between the subject vehicle and a passenger seat side vehicle positioned on a passenger side of the subject vehicle and a second spaced distance between the subject vehicle and a driver's seat side vehicle positioned on the driver's seat of the subject vehicle, and in the step of automatically parking the subject vehicle, the subject vehicle is controlled so that the first spaced distance and the second spaced distance are adjusted to be a predetermined reference distance.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a diagram showing components of an automatic parking system according to an exemplary embodiment of the present disclosure;

FIG. 2 is a flowchart showing a sequence of an automatic parking method according to an exemplary embodiment of the present disclosure;

FIG. 3 is a diagram showing a parking area at the time of parallel parking according to an exemplary embodiment of the present disclosure;

FIG. 4 is a diagram showing a parking area in a case in which there is a parking line at the time of parallel parking according to an exemplary embodiment of the present disclosure;

FIG. 5 is a diagram showing a parking area at the time of perpendicular parking according to an exemplary embodiment of the present disclosure;

FIG. 6 is a diagram showing a parking area in a case in which there is a parking line at the time of perpendicular parking according to an exemplary embodiment of the present disclosure;

FIG. 7 is a diagram showing a moving path at the time of parallel parking according to a first embodiment of the present disclosure;

FIG. 8 is a diagram illustrating an example of a change in a straight path of the first extended straight line according to the first embodiment of the present disclosure;

FIG. 9 is a diagram illustrating a moving path when a parking pace is narrow, according to the first embodiment of the present disclosure;

FIG. 10 is a diagram for explaining adjustment of a spaced distance at the time of automatic parking according to a second embodiment of the present disclosure; and FIG. 11 is a diagram for explaining adjustment of a spaced distance at the time of automatic parking according to a second embodiment of the present disclosure.

FIG. 12 is a diagram for explaining PAPS modes of automatic parking according to a third embodiment of the present disclosure FIG. 13 is a diagram for explaining driver/operator information and driver/operator activity in each of the PAPS modes according to a third embodiment of the present disclosure.

DETAILED DESCRIPTION

Hereinafter, embodiments of the present disclosure will be described in detail with reference to the accompanying drawings so that those skilled in the art may easily practice the present disclosure. However, the present disclosure may be implemented in various different forms and is not limited to the embodiments provided in the present description.

Portions unrelated to the description are omitted in order to obviously describe the present disclosure, and components that are the same as or similar to each other will be denoted by the same reference numerals throughout the specification A case in which any one part is "connected" with the other part includes a case in which the parts are "directly connected" with each other and a case in which the parts are "electrically connected" with each other with other elements interposed therebetween. In addition, unless explicitly described to the contrary, "comprising" any components will be understood to imply the inclusion of other elements rather than the exclusion of any other elements.

When it is described that any one part is "on" the other part, it may mean that the part is directly on the other part or any other part is interposed therebetween. On the contrary, when it is described that any one part is "directly on" the other part, there is no other part interposed therebetween.

Terms "first", "second", "third", and the like are used to describe various parts, components, areas, layers, and/or sections, but are not limited thereto. These terms are used only to distinguish one part, component, area, layer, or section from another part, component, area, layer, or section. Accordingly, a first part, a first component, a first area, a first layer, or a first section to be described below may indicate a second part, a second component, a second area, a second layer, or a second section without departing from the scope of the present disclosure.

Technical terms used herein are merely to describe a specific embodiment, but are not intended to limit the present disclosure. Singular forms used herein include plural forms unless context clearly indicates otherwise. A term "comprising" used in the specification specifies a specific characteristic, area, integer, step, operation, element, and/or component, but does not exclude a presence or an addition of any other characteristic, area, integer, step, operation, element, and/or component.

Terms "below", "above", and the like indicating a relative space may be used to more easily describe a relationship between one part with another part illustrated in the drawings. These terms are intended to include other meanings or operations of a device that is being used, in addition to meanings intended in the drawings. For example, when the device in the drawing is inverted, any part described as being "below" other parts may be described as being "above" the other parts. Therefore, the exemplary term "below" includes both of an upper direction and a lower direction. The device may rotate by 90° or other angles, and the terms indicating a relative space are interpreted according thereto.

Although not defined otherwise, all terms including technical terms and scientific terms used herein have the same meanings as those generally understood by a person having ordinary knowledge in the art to which the present disclosure pertains. Terms defined in a dictionary generally used are additionally interpreted as having a meaning consistent with the related art documents and contents currently disclosed, and unless defined otherwise, are not interpreted as having an ideal or very official meaning.

Hereinafter, embodiments of the present disclosure will be described in detail with reference to the accompanying drawings so as to be easily practiced by a person having ordinary knowledge in the art to which the present disclosure pertains. However, the present disclosure may be implemented in various different forms and is not limited to the embodiments provided in the present description.

FIG. 1 is a diagram showing components of an automatic parking system according to an exemplary embodiment of the present disclosure.

Referring to FIG. 1, an automatic parking system 1 may be implemented through connection among a processor level, an electrical control unit (ECU) level, and a controller level. Data sensed at the processor level may be transmitted to the ECU level, and the ECU level may control the controller level through the sensed data.

An MCU level may include a sensor 100, which may include a camera processor 110, a Lidar processor 120, a radar processor, and a GPS processor 140.

The camera processor 110 may sense a front area, a rear area, and/or a side area of a subject vehicle, and transmit data obtained therethrough to the ECU level. The camera processor 110 may largely include an image sensor, an image processor, and a camera MCU. As an example, the image sensor may sense an image of a subject photographed through a lens, the image processor may receive the sensed data from the image sensor and process the received data, and the camera MCU may receive the processed data from the image processor. For example, the data received by the camera MCU may include data on a preceding vehicle, data on a forward lane, data on a preceding cyclist, data on a traffic sign, data on active high beam control (AHB), data on wheel detection (e.g., data for more rapidly recognizing a vehicle through vehicle wheel recognition with respect to a close cut-in vehicle that comes into a field-of-view (FOV) of a camera), data on a traffic light, data on road marking (e.g., arrow on road), data on vehicle detection (VD) at any angle (data for recognizing a vehicle with respect to all driving directions or angles of the preceding vehicle), data on road profile (e.g., data for improving riding quality through suspension control by recognizing a shape of forward road (unevenness, a speed bump, or a hole)), data on semantic free space (e.g., boundary labeling), data on a general object (neighboring vehicle, etc.), data on advanced path planning (e.g., data for predicting a vehicle driving path by deep learning through surrounding environment even on a road without lane or a contaminated road), data on odometry (e.g., data for combination with recognition information of GPS by recognizing a landmark on a driving road), data on a parking line and data on an interval between vehicles for parking, etc.

The Lidar processor 120 may be connected to a Lidar device which is a sensor, and the Lidar device may sense a front area, a rear area, and a side area of the vehicle. The Lidar device may be configured of a laser transmission module, a laser detection module, a signal collection and processing module, and a data transmission and reception module, and as a light source of a laser, laser light sources with a wavelength in a wavelength range of 250 nm to 11 μm or with variable wavelength may be used. Further, the Lidar device may be classified into a time of flight (TOP) type and a phase shift type according to a signal modulation scheme.

The radar processor 130 may be connected to a radar device which is a sensor to sense an object in the front area, the rear area, and the side area of the vehicle. The radar device may be a sensor device using an electromagnetic wave to measure a distance, a speed, or and angle of an object. When using the radar device, it is possible to sense an object within 150 m in a horizontal angle range of 30 degrees by using a scheme of a frequency modulation carrier wave (FMCW), or a pulse carrier. The radar processor 130 may process data sensed and output by the radar device, and this processing may include magnification of the sensed forward object and focusing on an area of the object in the entire view area.

The GPS processor 140 is connected to a GPS device which is a sensor to measure a current position of the vehicle. The GPS device may be a device that may measure a position and a speed of the vehicle and time by communication with a satellite. Specifically, the GPS device may measure a delay time of a radio wave emitted from the satellite, and obtain the current position based on a distance from the satellite orbit.

A controller 200 is an electrical control unit (ECU) belonging to the ECU level, and may be a device integrally controlling multiple electronic devices used in a vehicle. For example, the controller 200 may control all of processors belonging to the processor level and controllers belonging to the controller level. The controller 200 may receive sensing data from the processors, generate a control command controlling a controller in consideration of circumstances, and transmit the control command to the controllers. In the present specification, for convenience of explanation, the ECU level is described as a higher level than the processor level, however, there may be a case in which one of the processors belonging to the processor level serves as an ECU, or a case in which two processors are combined to serve as an ECU.

The controller level may include a display controller 310, a steering controller 320, a driving controller 330, a brake controller 340, and a gear controller 350. Each of the controllers may control components of a vehicle based on the control command received from the controller 200.

The display controller 310 may be configured to provide the driver with information on a specific situation or to warn of dangerous situation. The display controller 310 may generate an audio signal, a video signal, or a haptic signal for warning of driving situation of the vehicle and dangerous situation. For example, the display controller 310 may output situation explanation and a warning sound in an audio way, and output a message about the situation or a warning message through an HUD display or a side mirror display. Alternatively, the display controller 310 may operate a vibration motor mounted in a handle to generate warning vibration.

The steering controller 320 may perform a control for a motor driving power steering (MDPS) system driving a steering wheel. For example, when collision of the vehicle is expected, the steering controller 320 may control a steering of the vehicle in a direction in which the collision may be avoided or a damage may be minimized.

The driving controller 330 may perform deceleration, acceleration, on/off of an engine to drive the vehicle. For example, the driving controller 330 may perform deceleration when collision is expected at the time of driving the vehicle, and perform on/off of the engine at the start or end of the driving of the vehicle according to the control command of the controller 200.

The brake controller 340 may control whether to operate a brake of the vehicle, and control a pedal effort of the brake. For example, when front collision is expected, the brake controller 340 may perform a control to automatically operate an emergency brake according to the control command of the controller 200 regardless of whether or not the driver operates the brake.

Meanwhile, hereinabove, the processors, the ECUs, and the controllers are described as independent components with reference to the accompanying drawings, but it is to be understood that the present disclosure is not necessarily limited thereto. Two or more processors may be integrated as one processor and may work in conjunction with each other, two or more processors and an ECU may be integrated as one device, two or more controllers may be integrated as one controller and may work in conjunction with each other, two or more controllers and an ECU may be integrated as one device.

FIG. 2 is a flowchart showing a sequence of an automatic parking method according to an exemplary embodiment of the present disclosure. The automatic parking system according to an exemplary embodiment of the present disclosure means a partially automated parking system (PAPS).

Referring to FIG. 2, the driver may set an automatic parking mode provided in the vehicle. By setting the automatic parking mode, a vehicle mode may be changed from a standby mode to an active mode in which automatic parking may be performed. A method of setting the automatic parking mode may include a first type method in which the driver executes the automatic parking mode while sitting on a driver's seat, and a second type method in which the driver executes the automatic parking mode outside the vehicle or while sitting on a seat other than the driver's seat by using a remote controller (S10). The sensor 100 may sense the surrounding area of the subject vehicle to calculate a plurality of parking areas in which the subject vehicle may be parked. The sensor 100 may sense parking lines, curbs disposed near the parking lines, an empty space between surrounding vehicles, etc. At this point, the controller may calculate parking areas by considering a length and a width of the subject vehicle (S20). The controller 200 may display to the driver data on the calculated parking areas through the display controller. The driver may select a parking area that is determined as an optimal parking area through a display device or a separate switch in the vehicle (the first type method), or may select a parking area that is determined as an optimal parking area by using a remote controller (the second type method). At this point, the controller 200 may recommend to the driver a parking area that is determined as an optimal parking area among the parking areas (S30). When an optimal parking area is determined, the controller 200 may calculate a moving path between a current position and the optimal parking area. A detailed method for calculating the moving path will be described below (S40). The controller 200 may drive the subject vehicle based on the moving path. The controller 200 may automatically drive the subject vehicle, and control the steering controller, the driving controller, the brake controller, and the gear controller. At this point, the controller 200 may control the subject vehicle at a speed of less than 10 km/h, and control deceleration or acceleration of the vehicle, gear change, braking and parking braking, etc. The sensor 100 may sense a distance from an obstacle during automatic parking of the subject vehicle, and the controller 200 may determine possibility of collision based on the distance between the subject vehicle and the obstacle and inform the driver of the determined possibility. The sensor 100 may include at least one of a camera device capable of sensing a distance between the subject vehicle and an obstacle, a Lidar device, and a radar device. The driver may select whether to perform automatic parking. When the driver executes the automatic parking, the controller 200 may automatically control the subject vehicle to park the subject vehicle in an optimal parking area, and when the driver dose not execute the automatic parking, the driver may directly park the subject vehicle in the optimal parking area. If the driver turns off an execution switch of the automatic parking mode or shift the gear to parking (P) during the automatic parking, the subject vehicle may stop. At this point, the controller 200 may request the driver to select whether to maintain the automatic parking mode through the display controller. Based on an intention of the driver, the automatic parking mode may be executed again or terminated. Further, when the gear is shifted to another gear other than parking (P) during the automatic parking, and when the steering is changed to a predetermined degree or more, the vehicle may stop. For example, steering change of a predetermined degree may mean a case in which about 5 Nm of torque is applied to the steering wheel. At this point, the controller 200 may request the driver to select whether to maintain the automatic parking mode through the display controller. Based on an intention of the driver, the automatic parking mode may be executed again or terminated. Further, when the braking is performed to a predetermined degree or more during the automatic parking, the controller 200 may determine that the braking of the driver should be preferentially performed, rather than application of the automatic parking system. That is, the subject vehicle may stop by the brake (S55 and S60). In addition, the automatic parking mode may be terminated following the intention of the driver. The driver may turn off the execution switch of the automatic parking mode (the first type) or cancel the execution of the automatic parking mode by using the remote controller (the second type) (S70).

FIG. 3 is a diagram showing a parking area at the time of parallel parking according to an exemplary embodiment of the present disclosure, and FIG. 4 is a diagram showing a parking area in a case in which there is a parking line at the time of parallel parking according to an exemplary embodiment of the present disclosure.

Referring to FIGS. 3 and 4, it is possible to detect parking areas in which parallel parking may be made through the sensor 100 attached to a subject vehicle 10. The sensor 100 may detect a parking line 21, a curb 22 disposed around parking areas, and a space between surrounding vehicles 50, and the controller 200 may calculate parking areas by calculating whether the spaces are a space in which the subject vehicle 10 may be parked based on such information. The controller 200 may calculate an optimal parking area 20 that is most suitable for parking among parking areas. The controller 200 may select an optimal parking area 20 by considering a length and a width of the subject vehicle 10.

Referring to FIG. 3, the controller 200 may calculate the optimal parking area 20 by calculating a space between surrounding vehicles 50. The curb 22 may assist in defining a space between surrounding vehicles 50. Further, the sensor 100 may sense an alignment line of the surrounding vehicles 50 parked in parallel to assist in calculating the optimal parking area 20. The optimal parking area 20 may have a length X1 extending in a direction in which the surrounding vehicles 50 are parked, and a width Y1 extending in a direction perpendicular to that of the length X1. The length X1 may be a value obtained by adding a length of the subject vehicle 10 and first room (+a), and the width Y1 may be a value obtained by adding a width of the subject vehicle 10 and second room (+b). For example, when the length of the subject vehicle 10 is short (4 m or less), the first room (+a) may satisfy +a=4 m×0.25 when the length of the subject vehicle 10 is ling (6 m or more), the first room (+a) may satisfy +a=6 m×0.25, and the second room (+b) may be 0.2 m. That is, the controller 200 may calculate the optimal parking area 20 by considering the length and the width of the subject vehicle 10.

Referring to FIG. 4, the sensor 100 may sense the parking line 21, and the controller 200 may determine whether the subject vehicle 10 may be parked by calculating a length X1 and a width Y1 of the parking line 21. The parking line 21 may have a contrast range of at least 5. The parking line 21 may have a constant width W1, and the controller 200 may determine whether it is an optimal parking area 20 by considering the length X1, the width Y1, and the width W1 of the parking line 21.

FIG. 5 is a diagram showing a parking area at the time of perpendicular parking according to an exemplary embodiment of the present disclosure, and FIG. 6 is a diagram showing a parking area in a case in which there is a parking line at the time of perpendicular parking according to an exemplary embodiment of the present disclosure.

Referring to FIGS. 5 and 6, it is possible to detect parking areas in which perpendicular parking may be made through the sensor 100 attached to the subject vehicle. The sensor 100 may detect a parking line 21 and a space between surrounding vehicles 50, and the controller 200 may calculate parking areas by calculating whether the spaces are a space in which the subject vehicle may be parked based on such information.

Referring to FIG. 5, the controller 200 may calculate the optimal parking area 20 by calculating a space between surrounding vehicles 50. The optimal parking area 20 may have a width Y2 extending in a direction in which the surrounding vehicles 50 are parked, and a length 2 extending in a direction perpendicular to that of the width Y2. The length X2 may be similar to the length of the subject vehicle, and the width Y2 may correspond to a value obtained by adding the width of the subject vehicle and third room (+c). For example, the third room (+c) may be 1.2 m.

Referring to FIG. 6, the sensor 100 may sense the parking line 21, and the controller 200 may determine whether the subject vehicle 10 may be parked by calculating a length X2 and a width Y2 of the parking line 21. The parking line 21 may have a contrast range of at least 5. The parking line 21 may have a constant width W2, and the controller 200 may determine whether it is an optimal parking area 20 by considering the length X2, the width Y2, and the width W2 of the parking line 21. For example, when the subject vehicle is a large vehicle, the length X2 may be longer than the length of the subject vehicle by 1.0 m, and the width Y2 may be longer than the width of the subject vehicle by 0.06 m. That is, the controller 200 may calculate the optimal parking area 20 by considering the length and the width of the subject vehicle 10.

FIG. 7 is a diagram showing a moving path at the time of parallel parking according to a first embodiment of the present disclosure.

Referring to FIG. 7, it is possible to calculate a moving path corresponding to the optimal parking area. A first extended straight line 41, a second extended straight line 42, and an intermediate extended straight line 43 may be sequentially calculated to calculate the moving path. The first extended straight line 41 may include a straight moving path at the time of the initial reverse from the steering angle that has been in a neutral position at the time of the reverse for parking. The second extended straight line 43 may be a straight line extending in a longitudinal direction of the optimal parking area at a final parking position obtained depending on a length of the calculated optimal parking area and a target parking position in the optimal parking area. The intermediate straight line may be a line connecting between the first extended straight line 41 and the second extended straight line 43 so that the vehicle coincides with the second extended straight line 43 without the vehicle moving backward along the first extended straight line 41 colliding with obstacles in front thereof when turning and moving backward toward the second extended straight line 43.

That is, as the vehicle turns and moves backward along the first extended straight line 41, the second extended straight line 43, and the intermediate extended straight line 42, it is possible to derive the moving path along the extended straight lines on the basis of the turning radius angle within the range in which the vehicle does not collide with the front vehicle. Accordingly, the process of deriving the moving path is simple and not complicated, such that the computation load at the time of calculating the moving path may be reduced.

Here, the first extended straight line 41 is positioned on the diagonal portion in front of the optimal parking area when the parallel parking is used as a reference, and may be set as the front and rear straight direction which is the moving direction of the vehicle. Further, the second extended straight line 43 coincides with the final parking position inside the optimal parking area when the parallel parking is used as a reference, and may be set as the front and rear straight direction that are the moving direction of the vehicle. In addition, the intermediate extended straight line 42 is a connecting path along which the vehicle enters the optimal parking area from the first extended straight line 41 when the parallel parking is used as a reference and may be formed to have a predetermined slope.

At this point, the slope of the intermediate extended straight line 42 may be set to be maximum so that the vehicle moving backward along the first extended straight line 41 turns at the minimum turning radius to coincide with the intermediate extended straight line 42 and the vehicle moving backward along the intermediate extended straight line 42 turns at the minimum turning radius to coincide with the second extended straight line 43. That is, if the slope of the intermediate extended straight line 42 is set to be the maximum angle if possible, when the vehicle turns at the minimum turning radius and enters the optimum parking area, the length of the best front and rear optimal parking area required for parking may be minimized, such that the parking may be made even if the length of the optimal parking area is short.

When the automatic parking is performed by deriving the moving path, the information on the optimal parking area and the extended straight line may be calculated by the sensor 100 installed in the vehicle. The sensor 100 may detect that the vehicle is approaching the extended straight lines and transmit the detected result to the controller 200, and the controller 200 may control controllers to automatically park the subject vehicle.

Here, a represents the turning angle at which a front right bumper may avoid the collision with a front obstacle. Further, by recognizing the intersection with respect to the extended straight line to derive the moving path, even if an error that causes the vehicle not to be aligned with the intermediate straight line 42, if the vehicle is aligned with the final extended straight line 43, the vehicle may be parked to coincide with the second extended line 43 while an error for the intermediate extended straight line 42 is offset.

FIG. 8 is a diagram illustrating a change in a straight path of the first extended straight line according to the first embodiment of the present disclosure.

Referring to FIG. 8, at the time of the first reverse, the first extended straight line 41 may be set to be various straight paths along which the vehicle turns to coincide with the intermediate extended straight line 42. That is, since the first extended line 41 may be set as various straight paths even when the vehicle is in the tilted state while being parallel to the second extended straight line 43, the moving direction of the subject vehicle may coincide with the intermediate extended straight line 42. As a result, the subject vehicle may move backward along the intermediate extended straight line 42.

FIG. 9 is a diagram illustrating a moving path when a parking pace is narrow, according to the first embodiment of the present disclosure. σ represents the turning angle at which the front right bumper may avoid the collision with the front obstacle, θ represents the final parking angle depending on the parking length, and φRS represents the slope angle of the vehicle when the vehicle is initially at the reverse parking.

Referring to FIG. 9, when the length of the optimal parking area is determined to be short with respect to a predetermined length, the second extended straight line 43 may be set as the straight path having a predetermined angle of slope θ with respect to the front and rear length direction of the optimal parking area. That is, when the length of the optimal parking area does not have a sufficient length at which the vehicle may be parked, the second extended straight line 43 is calculated to be tilted at a constant angle with respect to the front and rear longitudinal direction of the optimal parking area and thus the subject vehicle has a form in which the front portion of the subject vehicle protrudes toward the outside of the optimal parking area when the subject vehicle is aligned with the second extended straight line 43.

FIG. 10 is a diagram for explaining adjustment of a spaced distance at the time of automatic parking according to a second embodiment of the present disclosure. The driver's seat side distance a means a spaced distance between the subject vehicle and surrounding vehicles positioned on a driver's seat side of the subject vehicle and a passenger seat side distance b means a distance between the subject vehicle and the surrounding vehicles positioned on the passenger seat side.

Referring to FIGS. 1 and 10, when the subject vehicle enters the optimal parking area, the spaced distance between the subject vehicle and the surrounding vehicles can be adjusted. If the extracted passenger side distance b is smaller than the predetermined reference distance d when the subject vehicle enters the optimal parking area, it is determined that the space is not sufficient and if the driver's seat side distance a is enough to meet the reference distance d after a parking space with respect to the passenger seat side distance b is secured, a control to secure a spare space may be performed. The sensor 100 may measure the distance between the subject vehicle and vehicles positioned on both sides of the subject vehicle, and the controller 200 may compare measure the distance between the subject vehicle and vehicles positioned on both sides of the subject vehicle based on the data acquired by the sensor 100. On the other hand, when the driver's seat side distance a is not sufficient, the minimum spaced distance control may be performed.

That is, as in the present embodiment, the conditions under which the spare space securing control is performed are that the spaced distance between the vehicle and the passenger side vehicle is smaller than the reference distance (b<d) and the spaced distance between the vehicle and the passenger side vehicle is adjusted to be reference distance and then the spaced distance between the vehicle and the driver's seat side vehicle positioned on the driver's side of the vehicle is equal to or greater than the critical distance.

In this case, the critical distance may be expressed by the sum of the predetermined minimum spaced distance and |d−b|.

That is, when a≥minimum spaced distance+|d−b|, the spare space securing control may be performed, and the controller 200 may control the subject vehicle so that the distance between the vehicle and the passenger seat side vehicle is the reference distance. In this case, a distance control amount corresponds to d−b.

FIG. 11 is a diagram for explaining adjustment of a spaced distance at the time of automatic parking according to a second embodiment of the present disclosure.

Referring to FIG. 11, if the extracted passenger side distance b is smaller than the reference distance when the subject vehicle enters the optimal parking area, it is determined that the space is not sufficient and if the driver's seat side distance a is not enough to meet the reference distance d after the parking space with respect to the passenger seat side distance b is secured, the minimum spaced distance control is performed.

That is, as in the present embodiment, the conditions under which the minimum spaced distance control is performed are that the spaced distance between the subject vehicle and the passenger side vehicle is smaller than the reference distance (b<d) and the spaced distance between the vehicle and the passenger side vehicle is adjusted to be reference distance and then the spaced distance between the subject vehicle and the driver's seat side vehicle positioned on the driver's side of the subject vehicle is less than a critical distance.

In this case, the critical distance may be expressed by the sum of the predetermined minimum spaced distance and |d−b|.

That is, when a<minimum spaced distance+|d−b|, the minimum spaced distance control may be performed, and the controller 200 may control the subject vehicle so that the distance between the subject vehicle and the passenger seat side vehicle is the predetermined minimum spaced distance. At this point, the minimum spaced distance may be set to be a distance from a parking line between the subject vehicle and the driver's seat side vehicle to the subject vehicle or may be set to any value, and the distance control amount to which the vehicle moves corresponds to a–c.

FIG. 12 is a diagram for explain PAPS modes of automatic parking according to a third embodiment of the present disclosure. In this embodiment, a slot equals to a parking area in the previous embodiments. The modes described in this embodiment can be determined by a controller. Controller may be positioned in a vehicle or in a infrastructure.

Referring to FIG. 12, in a system ready mode, the automatic parking system informs the driver that the automatic parking system is ready for use. According to the present disclosure, the automatic parking system includes at least one of a vehicle which performs the automated parking and an infrastructure which controls the vehicle to perform the automated parking.

If the automatic parking system is not available, the automatic parking system informs the driver of a system condition (or status of the automatic parking system). The automatic parking system may inform the driver of the system condition via the display unit in the vehicle or a terminal device of the driver. For example, the automatic parking system may be activated by driver action (e.g. turn-on of main switch of the vehicle) or automatically.

In an slot search mode, the automatic parking system detects possible parking areas. For example, the vehicle may search the available parking areas using sensors attached the vehicle. In addition, an infrastructure which controls the vehicle may detect the parking areas using sensors controlled by the infrastructure. The automatic parking system may search the parking area according to ways described above.

In an slot found mode, the automatic parking system informs the driver of the parking areas detected as a result of searching. For example, the automatic parking system may show at least one parking areas as a result of searching via the display unit.

In an select slot mode, the driver executes the automatic parking mode while sitting on a driver's seat (the first type method), or the driver executes the automatic parking mode outside the vehicle or while sitting on a seat other than the driver's seat by using a remote controller (the second type method). The driver may select a parking area (slot) that is determined as an optimal parking area through a display device or a separate switch in the vehicle (the first type method), or may select a parking area that is determined as an optimal parking area by using a remote controller (the second type method).

In an automated parking maneuver mode, the automatic parking system controls the vehicle to move the vehicle into the selected parking area (i.e. the optimal parking area). For example, the automatic parking system may control steering, acceleration, deceleration, gear changes and emergency brake to move the vehicle into the selected parking area. The vehicle may be automatically parked according to the ways described above.

While the vehicle performs the automated parking into the selected parking area, the automatic parking system prevents the vehicle from colliding with objects in the surrounding area of the vehicle. For example, the automatic parking system may detect obstacles in the surrounding area and informs the driver of the possibility of the collision.

The automatic parking system controls steering, acceleration, deceleration, gear changes and emergency brake of the vehicle to avoid a collision with the obstacles. Intervention or action by the driver to avoid the collision may overrides the control of the automatic parking system at any time. The driver may indicate to the automatic parking system to continue the controls of the automatic parking system. For example, the driver may indicate to the automatic parking system to continue the controls by stopping maneuvering at least one of steering wheel, brake and accelerator or by interacting with the display unit (the first type method). Also, the driver may indicate to the automatic parking system to continue the controls by continually pressing the command switch. The automatic parking system possess the functionality for continued control when the driver pressing the command switch and cancels control when the driver releases the command switch.

FIG. 13 is a diagram for explaining driver/operator information and driver/operator activity in each of the PAPS modes according to a third embodiment of the present disclosure.

Referring to FIG. 13, when PAPS is in a system ready mode, the driver/operator information may be "system activated." For example, a display device inside the vehicle may display "system activated." In another example, sound device such as speaker inside the vehicle may be used to inform the driver of the current mode. In another example, haptic device may be used. PAPS may start system ready mode by driver's action such as Main switch on.

The PAPS may start slot search mode by driver's input or infrastructure's input. For example, the driver may push a button to activate automated parking. In another example, the infrastructure may transmit signal to activate automated parking. When PAPS is in slot search mode, the driver/operator information may be "Searching for slots."

The PAPS may start slot found mode when the vehicle has found at least one available parking slots. Then, the driver/operator information may be "Slot search results." For example, a display device inside the vehicle may display the number of available parking slots. Also, the display device may display the position of the available parking slots. For example, the display device may display "2 available slots on the right and 3 available slots in the left."

The PAPS may start slot select mode when one or more available slots are found. Then, the driver/operator information may be available slots. For example, a display device inside the vehicle may graphically display one or more available parking slots. In the slot select mode, the driver may select one parking slot among the displayed one or more available slots. In another example, the infrastructure may select one parking slot and may transmit signal to identify the selected parking slot to the vehicle.

The PAPS may start automated parking maneuver in response to the selection of the slot. Driver/operator information may be "system is controlling obstacles along the path." For example, the display inside the vehicle may graphically display a video which shows the vehicle, the parking lines and obstacles. This can be AVM (around view monitor). In case a sudden obstacle such as animal or person appears, the automated parking maneuver may be stopped. After the sudden obstacle disappears, the automated parking maneuver may be resumed by driver/operator's input.

According to the exemplary embodiment of the present disclosure, it is possible to provide the automatic parking system capable of setting an optimal parking area among parking areas to automatically perform parking from a current position of a subject vehicle to the optimal parking area.

The embodiment of the present disclosure may be applied to various parking conditions by simply deriving the moving path when the vehicle is parked by calculating the three extended straight lines along the moving path when the vehicle is parked and controlling the subject vehicle to be steered at the intersection of the straight lines.

According to the embodiment of the present disclosure, it is possible to make a driver conveniently get into and out of own vehicle and surrounding vehicles by controlling the spaced distance from the surrounding vehicles parked on both sides of the subject vehicle when the automatic parking system is performed.

According to the embodiment of the present disclosure, it is possible to readjust the spaced distance between the subject vehicle and the surrounding vehicles if it is determined that the drivers of the surrounding vehicles may not easily get into and out of vehicles based on the detected parking condition.

Meanwhile, it is to be understood that a partially automated parking system is described in the present specification by way of example for convenience of explanation. As described above, the PAPS is merely one of several advanced driving assistance system (ADAS) functions, and it is to be understood that implementation of the PAPS suggested in the present disclosure may also be used for implementation of other relevant ADAS functions. For example, the method suggested in the present disclosure may also be used to implement one function or a combination of a plurality of functions ADAS functions such as a PAPS, a land departure warning system (LDWS), a lane keeping assistance system (LKAS), a pedestrian detection and collision mitigation system (PDCMS), a forward vehicle collision warning system (FVCWS), a low speed following (LSF), a maneuvering aids for low speed operation (MALSO) and an extended range backing aid (ERBA), etc.

In one or more exemplary embodiment of the present disclosure, the described functions may be implemented by hardware, software, firmware, or a combination thereof. In a case of implementation as software, the functions may be stored in or transmitted to a computer-readable medium as one or more commands or codes. The computer-readable medium includes all communication medium and computer storage medium including any medium facilitating transmission of a computer program from one place to another place. The storage medium may be any available medium that is accessible by a computer. As a non-limitative example, the computer-readable medium may include a RAM, a ROM, an EEPROM, a CD-ROM, or other optical disc storage, a magnetic disc storage or other magnetic storage device, or any other medium that may be used to transfer or store a desired program code in a form of a command or a data structure and is accessible by a computer. Further, an arbitrary connection is appropriately referred to as a computer-readable medium. For example, when software is transmitted from a website, a server, or other remote source by using a coaxial cable, an optical fiber cable, a twisted-pair cable, a digital subscriber line (DSL), or wireless technologies such as infrared, radio, and ultra high frequency, the coaxial cable, the optical fiber cable, the twisted-pair cable, the DSL, or the wireless technologies such as infrared, radio, and ultra high frequency are included in definition of the medium. The disk and disc as used herein includes a compact disc, a laser disc, an optical disc, a digital versatile disc (DVD), a floppy disc, and a Blu-ray disc, and disks generally magnetically reproduce data, but discs optically reproduces data by laser. The above combinations also should be included in a range of the computer-readable medium.

When the exemplary embodiments are implemented by a program code or code segments, it is to be recognized that the code segment may represent a procedure, a function, a sub-program, a program, a routine, a sub-routine, a module, a software package, a class, or any combination of commands, data structures, or program instructions. The code segment may be connected to another code segment or a hardware circuit by transferring and/or receiving information, data, an argument, a parameter, or memory contents. The information, the data, the argument, the parameter, and the like may be transferred, sent, or transmitted by using any appropriate means including memory share, message transmission, token transmission, network transmission, etc. In addition, in some aspects, steps and/or operations of a method or an algorithm may reside as one of codes and/or commands or any combination or a set thereof on a machine-readable medium and/or a computer-readable medium that may be integrated as a computer program object.

In the implementation as software, technologies described herein may be implemented by modules (e.g., procedure, function, etc.) performing the functions described herein. The software codes may be stored in memory units and may be executed by processors. A memory unit may be implemented in a processor or outside the processor, and in this case, the memory unit may be connected to the processor in a manner that the memory unit may perform communication with the processor by various means as known in the art.

In implementation as hardware, processing units may be implemented by one or more of an application specific integrated chip (ASIC), a digital signal processor (DSP), a digital signal processing device (DSPD), a programmable logic device (PLD), a field programmable gate array (FPGA), a processor, a controller, a microcontroller, a microprocessor, and other electronic units designed to perform the functions described herein, or in a combination thereof.

The above description includes an example of one or more exemplary embodiments. It is apparent that those skilled in the art may recognize that every possible combinations of components or method may not be described for explanation of the above described exemplary embodiments, but additional combination and substitution of various exemplary embodiments may be possible. Therefore, the described exemplary embodiments include all alternatives, changes, and modifications within the spirit and scope of the accompanying claims. Furthermore, regarding a range in which a term "comprising" is used in the detailed description or claims, the term is included similarly to a term "be configured" as interpreted when the term "be configured" is used as a transitional word in the claims.

As used herein, a term "inferring" or "inference" generally refers to a process of determining or inferring a state of a system, an environment, and/or a user based on observation of one set captured by events and/or data. The inference may be used to identify a specific situation or operation, or may generate probability distribution with respect to, for example, states. The inference may be probabilistic, that is, may be calculation of probability distribution with respect to corresponding states based on consideration of data and events. The inference may also refer to technologies used to configure upper level events from one set of events and/or data. Such inference enables estimation of new events or operations from one set of observed events and/or stored event data, whether events are closely related in time, and whether events and data come from one or several events and data sources.

Furthermore, as used in the present application, terms "component", "module", "system", and the like include, but not limited to, hardware, firmware, a combination of hardware and software, software, or a computer-related entity such as software being executed. For example, a component may be, not limited to, a process performed on a processor, a processor, an object, executable execution thread, a program, and/or a computer. For example, both of an application driven by an operational device and the operational device may be a component. One or more components may reside in a process and/or execution thread, and a component may be concentrated on one computer, and/or dispersed between two or more computers. Further, these components may be executed from various computer-readable medium storing various data structures. Components may perform communication by a local and/or remote process such as according to a signal having one or more data packets (for example, data from any component interacting with other components of a local system and distribution system and/or other systems by a signal through a network like Internet).

What is claimed is:

1. An automatic parking system, comprising:
   a sensor detecting slots depending on a size of a subject vehicle; and
   a controller controlling the subject vehicle to be parked in an optimal slot among the detected slots and determining a partially automated parking system (PAPS) mode from a group of modes comprising a system ready mode, a slot search mode, a slot found mode, a select slot mode and an automated parking maneuver mode,
   wherein, in the slot search mode, the sensor detects the slots in consideration of a length and a width of the subject vehicle, and
   wherein, in the automated parking maneuver mode, the controller calculates a moving path between a current position of the subject vehicle and the optimal slot, detects spaced distances from surrounding vehicles positioned on a side of the subject vehicle in the optimal slot, and controls the subject vehicle based on a predetermined reference distance and the spaced distances.

2. The automatic parking system of claim 1,
   wherein the controller determines the system ready mode, and outputs information of "system activated" to a driver or operator.

3. The automatic parking system of claim 2,
   wherein when the automatic parking system is not available, the controller outputs information of a system condition to the driver or operator, the system condition comprising a status of the automatic parking system.

4. The automatic parking system of claim 2,
   wherein the information is output in a manner of graphic, sound or haptic.

5. The automatic parking system of claim 1,
   wherein the controller determines the slot search mode in response to an activation input from a driver of infrastructure, and outputs information of "searching for slots" to a driver or operator.

6. The automatic parking system of claim 1,
   wherein the controller determines the slot found mode in response that the sensor has found at least one parking slots, and outputs information of "slot search results" to a driver or operator.

7. The automatic parking system of claim 6,
   wherein the information is output in a manner of graphically displaying the number of available parking slots, and the positions of the available parking slots.

8. The automatic parking system of claim 1,
   wherein the controller determines the select slot mode after the slot found mode, and outputs information of available slots, and receives driver/operator input to select a slot for parking.

9. The automatic parking system of claim 1,
   wherein the controller determines the automated parking maneuver mode, and outputs information of "system is controlling vehicle along the path" to a driver or operator.

10. The automatic parking system of claim 9,
    wherein the information is output in a manner of graphically displaying a video which shows the vehicle, the parking lines and obstacles, by Around View Monitor.

11. An automatic parking method for automatically parking a subject vehicle, the automatic parking method comprising steps of:
    determining a system ready mode and outputting information of "system activated" to a driver or operator;
    receiving an activation input from the driver or infrastructure;
    determining a slot search mode, outputting information of "searching for slots" to the driver or operator, and detecting by a sensor parking slots in consideration of a length and a width of the subject vehicle;
    determining a slot found mode and outputting information of "slot search results" to the driver or operator;
    determining a select slot mode, outputting information of at least one available slots, and receiving driver/operator input to select a slot for parking;
    determining an automated parking maneuver mode, calculating, a moving path between a current position of the subject vehicle and an optimal slot,
    automatically parking the subject vehicle in the optimal slot, wherein the subject vehicle is controlled by sensing spaced distances between the subject vehicle and surrounding vehicles in the optimal slot, and outputting information of "system is controlling vehicle along the path" to the driver of operator,
    wherein the automatic parking method further comprises, when an automatic parking system is not available, outputting information of a system condition to the driver or operator, the system condition comprising a status of the automatic parking system.

12. The automatic parking method of claim 11,
    wherein the information output in the system ready mode is output in a manner of graphic, sound or haptic.

13. The automatic parking method of claim 11,
    wherein the information output in the slot found mode is output in a manner of graphically display the number of available slots, and the positions of the available slots.

14. The automatic parking method of claim 11,
wherein the information output in the automated marking maneuver mode is output in a manner of graphically displaying a video which shows the vehicle, the parking lines and obstacles by Around View Monitor.

\* \* \* \* \*